United States Patent [19]

Burris

[11] Patent Number: 4,747,616
[45] Date of Patent: May 31, 1988

[54] STATUS INDICATOR FOR PASSIVE BELT SYSTEM

[75] Inventor: Darryl L. Burris, Holt, Mich.

[73] Assignee: General Motors Corporation, Detroit, Mich.

[21] Appl. No.: 66,656

[22] Filed: Jun. 25, 1987

[51] Int. Cl.[4] ............................................. B60R 22/34
[52] U.S. Cl. .................................... 280/807; 180/268; 280/803
[58] Field of Search ............... 280/801, 802, 803, 807; 180/268; 200/310; 315/136

[56] References Cited

U.S. PATENT DOCUMENTS

| | | | |
|---|---|---|---|
| 3,875,556 | 4/1975 | Beroird | 280/801 |
| 4,597,587 | 7/1986 | Yoshitsugu et al. | 280/807 |
| 4,598,932 | 7/1986 | Comperou et al. | 280/807 |
| 4,603,877 | 8/1986 | Espinoza et al. | 280/807 |

Primary Examiner—Ross Weaver
Attorney, Agent, or Firm—Charles E. Leahy

[57] ABSTRACT

An electrical circuit includes a signal device such as a reminder lamp which is mounted on the instrument panel of the vehicle body remote from a door mounted seat belt retractor and a switch associated with the door latch. Electricity is conducted from the vehicle battery and the fuse block suitably mounted near the instrument panel, and then through the door jamb into the vehicle door where the door latch switch is connected in series with a solenoid associated with the seat belt retractor. Operation of the door handle or movement of the latch bolt to the unlatched position will close the switch and energize the solenoid. The circuit includes a relay having a coil interposed in the circuit remote from the door mounted solenoid and door latch switch. The relay coil is sensitive to a threshold of electrical current flowing therethrough at a level equal to or less than the current draw of the solenoid so that the coil closes a set of contacts to complete the electrical circuit energizing the reminder lamp. Accordingly, whenever the door handle is operated or the door is opened, the circuit is energized and the lamp is illuminated. In addition, should the solenoid remain energized after the door is closed, the reminder lamp remains illuminated to indicate the need for vehicle service.

2 Claims, 1 Drawing Sheet

STATUS INDICATOR FOR PASSIVE BELT SYSTEM

The invention relates to a status indicator for a passive seat belt system and more particularly provides an electrical sensor and indicator arrangement for indicating closure of a switch located at a remote location on the vehicle door.

BACKGROUND OF THE INVENTION

It is known in motor vehicles to provide a passive seat belt system in which an inertia operated seat belt retractor is mounted on the vehicle door for winding and unwinding a seat belt having its end mounted inboard the vehicle seat. Accordingly, when the door is closed, the seat belt is wound to a restraining position about the seated occupant. When the door is opened, the belt unwinds from the retractor and the swing geometry of the door establishes the belt outwardly and forwardly to enable occupant ingress and egress.

It has also been recognized as desirable to desensitize the door mounted inertia retractor upon opening of the vehicle door so that the inertia stimulus of door opening movement will not lock the retractor.

One preferred arrangement is disclosed in U.S. Pat. No. 4,598,932, Compeau et al, entitled Control Means For Occupant Restraint Belt System. The operation of either the inside handle or the outside handle temporarily desensitizes the inertia lock of the retractor. This desensitization is maintained, even if the inside or outside operator is released, by movement of the latch bolt toward its unlatched position during opening movement of the door. A sensor, such as a switch associated with the door latch, is electrically connected to a solenoid associated with the seat belt retractor. When the switch is closed by operating the inside or outside operator, or by movement of the latch bolt to the unlatched position, the solenoid is energized and operates a lever to desensitize the inertia sensor.

It would be desirable to provide a signal on the instrument panel to indicate to the occupant that the retractor inertia locking mechanism is temporarily desensitized.

SUMMARY OF THE INVENTION

The present invention provides an electrical circuit which includes an electrical signal device such as a reminder lamp which is mounted on the instrument panel of the vehicle body remote from a door mounted seat belt retractor and a switch associated with the door latch. Electricity is conducted from the vehicle battery and the fuse block suitably mounted near the instrument panel, and then through the door jamb into the vehicle door where the door latch switch is connected in series with the seat belt retractor solenoid. Operation of the door handle or movement of the latch bolt to the unlatched position will close the switch and energize the solenoid. The circuit includes a relay having a coil interposed in the circuit remote from the door mounted solenoid and door latch switch. The relay coil is sensitive to a threshold of electrical current flowing therethrough at a level equal to or less than the current draw of the solenoid so that the coil closes a set of contacts to complete the electrical circuit energizing the reminder lamp. Accordingly, whenever the door handle is operated or the door is opened, the circuit is energized and the lamp is illuminated. In addition, should the solenoid remain energized after the door is closed, the reminder lamp remains illuminated to indicate the need for vehicle service.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 2:
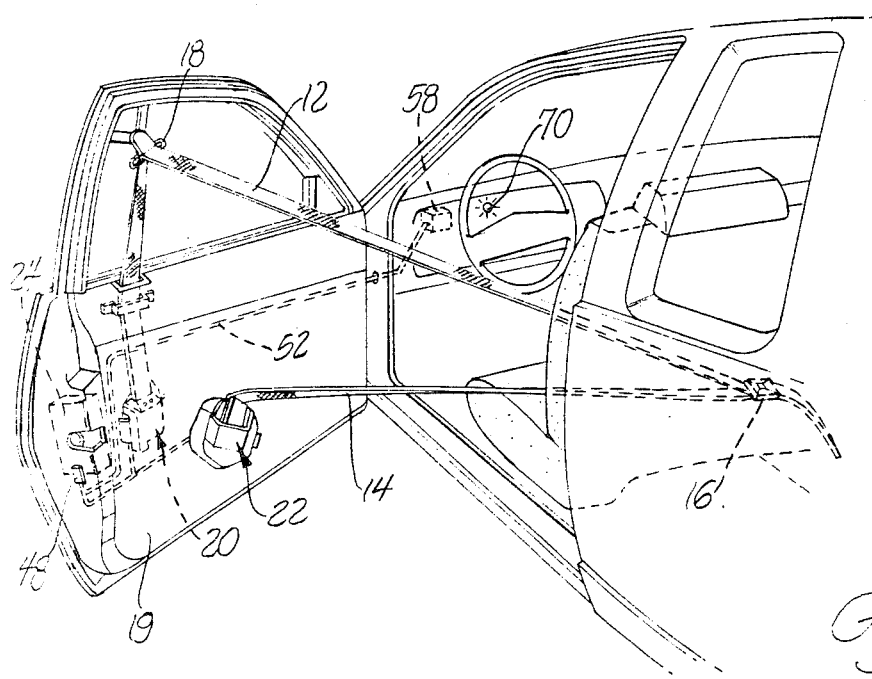
FIG. 2 is a perspective view of a passive seat belt system embodying the electrical circuit of this invention.

Referring to FIG. 2 there is shown a vehicle body having a door mounted passive seat belt system. The belt system includes a shoulder belt 12 and a lap belt 14 having inboard ends anchored on the vehicle body inboard the occupant seat by a release buckle 16. The outboard end of the shoulder belt 12 passes through a guide loop 18 mounted on the upper rear corner of the door 19 and extends vertically along the rear edge of the door and is attached to the reel of a shoulder belt retractor 20 mounted on the lower rear corner of the door. The outboard end of the lap belt 14 is mounted on the door by a lap belt retractor 22. When the door is opened, as shown in FIG. 2, the shoulder belt 12 and the lap belt 14 are fully unwound from their respective retractors and the swing geometry of the door 19 has established the outboard ends of the lap and shoulder belts outwardly and forwardly with respect to the occupant seat to facilitate ingress and egress. When the occupant enters the seat and closes the door, the door mounted retractors rewind the shoulder belt 12 and lap belt 14 to their restraining positions about the seated occupant. The vehicle door carries a door latch 24 which latches with a striker pin mounted on the vehicle body when the door is closed to latch the door in the closed position.

Figure 3:
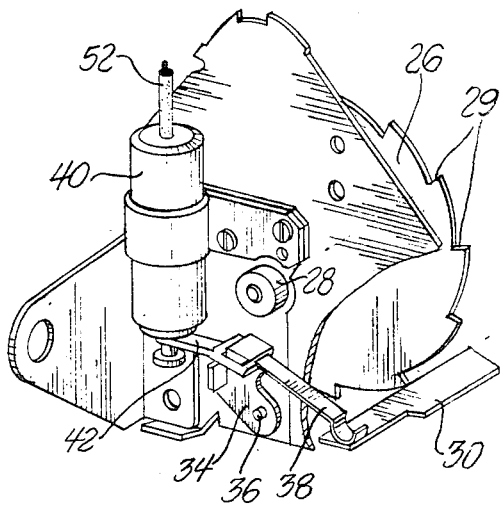
FIG. 3 is a partial fragmentary view of a seat belt retractor having a solenoid.

The shoulder belt 20 and the lap belt retractor 22 are retractors of the inertia locking type. FIG. 3 shows the lap belt retractor 22 which includes a belt reel 26 rotatably mounted by a reel shaft 28. The reel 26 carries ratchet teeth 29 which are engageable by a lock bar 30 which is normally spaced away from the ratchet teeth 29 and is pivoted into engagement with the ratchet teeth 29 by a inertia responsive pendulum, not shown. Because the retractor 22 is mounted on the vehicle door, it will be understood that a very rapid opening movement of the door may trigger the pendulum and move the lock bar 30 into engagement with reel 26, thereby locking the reel against belt unwinding rotation. Accordingly, prior art such as U.S. Pat. Nos. 3,692,328, Arlauskas; 3,727,943, Augunas; and 4,598,832, Compeau, have taught mechanisms responsive to the condition of the door latch for desensitizing the inertia locking mechanism when the vehicle door is to be opened. FIG. 3 shows such a mechanism including a lever 34 pivoted on the retractor frame by a pivot pin 36 and carrying a leaf spring 38 which is pivoted into overlying engagement with the lock bar 30 upon energization of a solenoid 40 which is connected to an end 42 of the lever 34.

Figure 1:
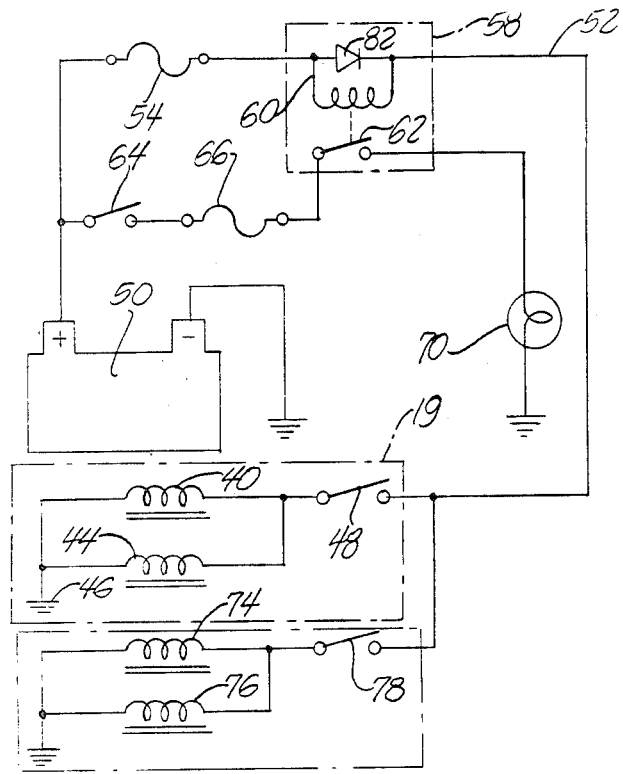
FIG. 1 is the electrical circuit of this invention.

The solenoid 40 of FIG. 3 is energized by an electrical circuit shown in FIG. 1. The solenoid 40 associated with the lap belt retractor 22, and a similar solenoid 44 associated with the shoulder belt retractor 20, are both mounted on the driver's door and connected to a ground 46.

A switch 48 is also mounted on the vehicle door and is operably connected to the door latch 24 as taught by Compeau U.S. Pat. No. 4,598,932. Accordingly, whenever the inside or outside door handle is pulled, or when the latch bolt of the door latch 24 is moved to its unlatched position, the switch 48 is moved to a closed position. A battery 50 is mounted in the engine compartment and connected to the switch 48 by a conductor 52 which extends from the engine compartment to a fuse block 54 mounted adjacent the instrument panel, and then through the door jamb to the vehicle door 19 and the switch 48 associated with the door latch. Accordingly, whenever the switch 48 is closed by the functioning of the door latch 24 as described hereinbefore, the solenoid 40 is energized and operates lever 34 to carry the leaf spring 38 into overlying engagement with the retractor lock bar 30.

The circuit of FIG. 1 also includes the sensor and indicator arrangement for indicating closure of the door latch switch 48 located remotely at the end of the driver's door 19. A relay 58 is located adjacent the vehicle instrument panel and includes a coil 60 which is interposed in the conductor 52 remote from the door latch switch 48 and the solenoid coil 40. The relay 58 also includes a normally open switch 62 which is closed by the coil 60. The coil 60 is sensitive to the level of current flowing from the battery 50 to the solenoid 40. The relay coil 60 is sensitive to a threshold level of current flow less than the current draw of the solenoid 40 so that the coil is energized and closes the switch 62 at a level of current flow which occurs upon closure of the door latch switch 48.

Referring again to FIG. 1, it is seen that the switch 62 is connected to the battery 50 through an ignition switch 64 and fuse 66. The switch 62 is also connected to an electrical indicator device, such as a signal lamp 70. Accordingly, when the switch 62 is closed by the existence of a sensed current flow to the remotely located solenoid 40, the circuit from the battery 50 to the signal lamp 70 is completed so that the signal lamp 70 is illuminated to indicate to the vehicle driver that the solenoid has been energized by the closure of the door latch switch 48.

FIG. 1 also shows a diode 82 arranged in parallel with the coil 60. In the event of a short occurring in the door, such as during service of the door latch or retractor, the diode will conduct the excess current around the coil 60 so that the fuse 54 will open without the coil 60 overheating.

This status indicating system for a passive seat belt is useful to the driver because it reminds the driver that the door is open and that the retractor locking mechanism has been desensitized to permit opening movement of the door. Furthermore, should the indicator light 70 remain illuminated after the driver has closed the door, the signal device serves to remind the driver that the seat belt system may be in need of service attention.

Furthermore, it will be understood that the remote sensing signal indicating device of this invention is also useful in seat belt retractors of the type in which the inertia sensor is an electrical inertia switch which functions to complete an electrical circuit to a solenoid which in turn moves the lock bar into locking engagement with the seat belt reel. When used in that type of seat belt retractor, the illumination of the signal lamp 70 will indicate that the inertia switch is closed and the solenoid energized to lock the seat belt retractor.

Referring again to FIG. 1, it is seen that the electrical circuit also includes solenoids 74 and 76 associated respectively with the shoulder belt retractor and lap belt retractor of the right hand door of the vehicle body and a door latch switch 78 associated with the right hand door latch. Accordingly it will be appreciated that the closure of the switch 78 will energize the status indicator circuit in the same manner as the driver's door latch switch 48.

Thus it is seen that the invention provides a new, novel and useful status indicator located remotely from door mounted retractor and its associated electrical load device for indicating the status of that load device.

The embodiments of the invention in which an exclusive property or privilege is claimed are defined as follows:

1. In a vehicle having a seat belt system including a seat belt retractor mounted on the vehicle door and having an associated electrical device operative upon energization to effect an operating mode of the retractor, a switch mounted on the vehicle door for energizing the associated electrical device, and an electrical circuit extending from a battery located on the vehicle body remotely from the vehicle door, a remote sensing signal device for indicating closure of the switch and energization of the associated electrical device, comprising:

an electrical indicator mounted on the instrument panel of the vehicle body remote from the door mounted retractor and the switch, a relay having a coil situated in the circuit remote from the electrical device associated with the retractor and a set of normally open contacts in series with the electrical indicator so that energization of the coil closes the contacts and energizes the electrical indicator to indicate that the switch is closed and the device associated with the retractor energized to control the operating mode of the retractor;

said relay coil being sensitive to an electrical current flow threshold therethrough of a level less than the current draw of the electrical device associated with the retractor so that the coil and the electrical indicator are energized whenever the switch is closed whereby the electrical energization of the electrical device associated with the retractor is remotely sensed and indicated to the vehicle operator.

2. In a vehicle having a passive seat belt system including an inertia sensitive seat belt retractor mounted on the vehicle door and having an associated electrical device operative upon energization to desensitize the inertia sensitive retractor to facilitate rapid door opening movement, a switch mounted on the vehicle door for energizing the associated electrical device, and an electrical circuit extending from a battery located on the vehicle body remotely from the vehicle door, a remote sensing signal device for indicating closure of the switch and energization of the associated electrical device, comprising:

an electrical indicator mounted on the instrument panel of the vehicle body remote from the door mounted retractor and the switch; and a relay having a coil situated in the circuit remote from the electrical device associated with the retractor and a set of normally open contacts in series with the electrical indicator so that energization of the coil closes the contacts and energizes the electrical indicator to indicate that the switch is closed and the device associated with the retractor energized to desensitize the inertia sensitive retractor during door opening movement;

said relay coil being sensitive to an electrical current flow threshold therethrough of a level less than the current draw of the electrical device associated with the retractor so that the coil and the electrical indicator are energized whenever the switch is closed whereby the electrical energization of the electrical device associated with the retractor is remotely sensed and indicated to the vehicle operator.

* * * * *